Sept. 4, 1923.  
P. DUMONT  
1,466,996  
DISCHARGE APPARATUS FOR LIME KILNS AND THE LIKE  
Filed March 21, 1921  2 Sheets-Sheet 1

INVENTOR  
Paul Dumont  
BY  
ATTORNEYS.

Sept. 4, 1923.

P. DUMONT 1,466,996

DISCHARGE APPARATUS FOR LIME KILNS AND THE LIKE

Filed March 21, 1921  2 Sheets-Sheet 2

INVENTOR
Paul Dumont
BY
ATTORNEYS.

Patented Sept. 4, 1923.

1,466,996

UNITED STATES PATENT OFFICE.

PAUL DUMONT, OF AMPSIN, BELGIUM.

DISCHARGE APPARATUS FOR LIME KILNS AND THE LIKE.

Application filed March 21, 1921. Serial No. 453,982.

*To all whom it may concern:*

Be it known that I, PAUL DUMONT, a subject of the King of Belgium, and resident of Ampsin, in the Kingdom of Belgium, have invented certain new and useful Improvements in and Relating to Discharge Apparatus for Lime Kilns and the like; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

This invention relates to discharge apparatus for lime kilns and the like.

The invention has for its subject an apparatus for the automatic and continuous discharging of materials which apparatus is arranged and constructed with a view to affording the least possible resistance and to obtaining a regular descent of the material in to the furnace in order to obtain a finished evenly roasted product.

This result may be obtained by arranging beneath the mouth of the discharging hoppers, platforms on which the material emerging from the hoppers rests, and above which in the space comprised between these platforms and the lower edge of the hoppers, bars may travel which push the material to the edge of the said platforms and force it to overflow. The materials which fall from the said floors may be removed by means of a suitable conveyor.

In a particularly advantageous form of construction of the invention, the material overflows from the platforms arranged beneath the hoppers under the action of raking bars, then falls on to a grate or grid arranged beneath the bars, and this grate retains the coarser material and allows the finer material to pass through and fall on a platform arranged beneath this grating. The raking bars, the grid and the lower platform are connected one with another and may have a rotary movement imparted to them in such a way that the materials which fall from the fixed platforms arranged beneath the hoppers are spread over the movable grid and on the lower platform working in conjunction with this grid.

The materials carried respectively by the grid and the movable platform are removed by scrapers arranged so as to direct them on to travelling belts which convey them to any suitable points.

Referring now to the accompanying drawings in which an example of construction of the apparatus for carrying out the invention is illustrated:—

Figure 1:
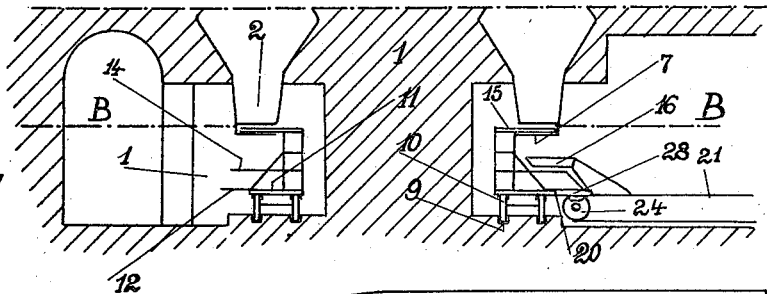
Fig. 1 is a vertical section on the line A—A of Fig. 2, showing the lower part of the furnace or kiln and the respective positions of the hoppers and the revolving bed or sole.
Figure 2:
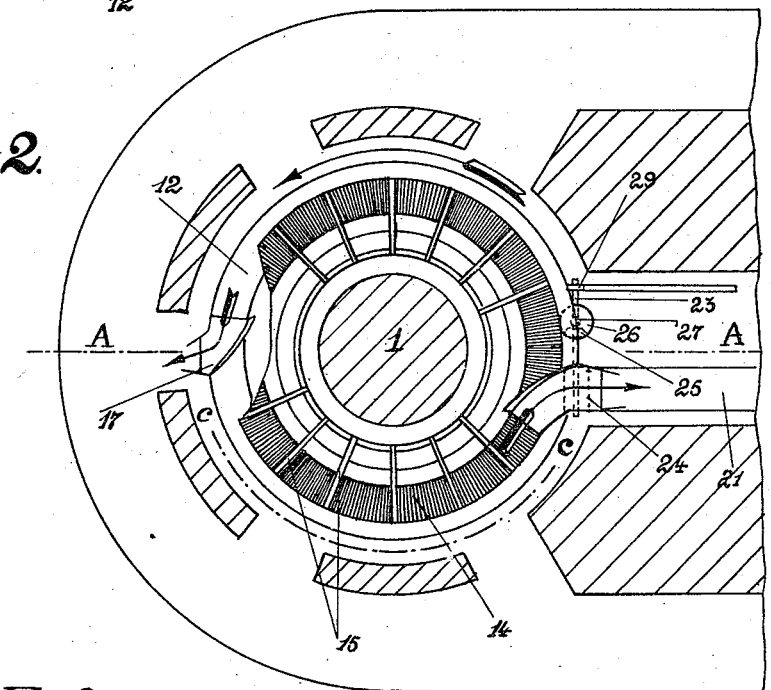
Fig. 2 is a section on the line B—B of Fig. 1 showing the revolving bed or sole.
Figure 3:
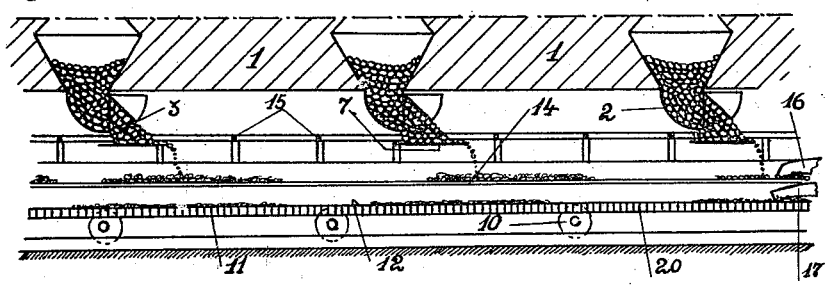
Fig. 3 is a view in extended elevation of the discharging passage on the line C—C of Fig. 2.
Figure 4:
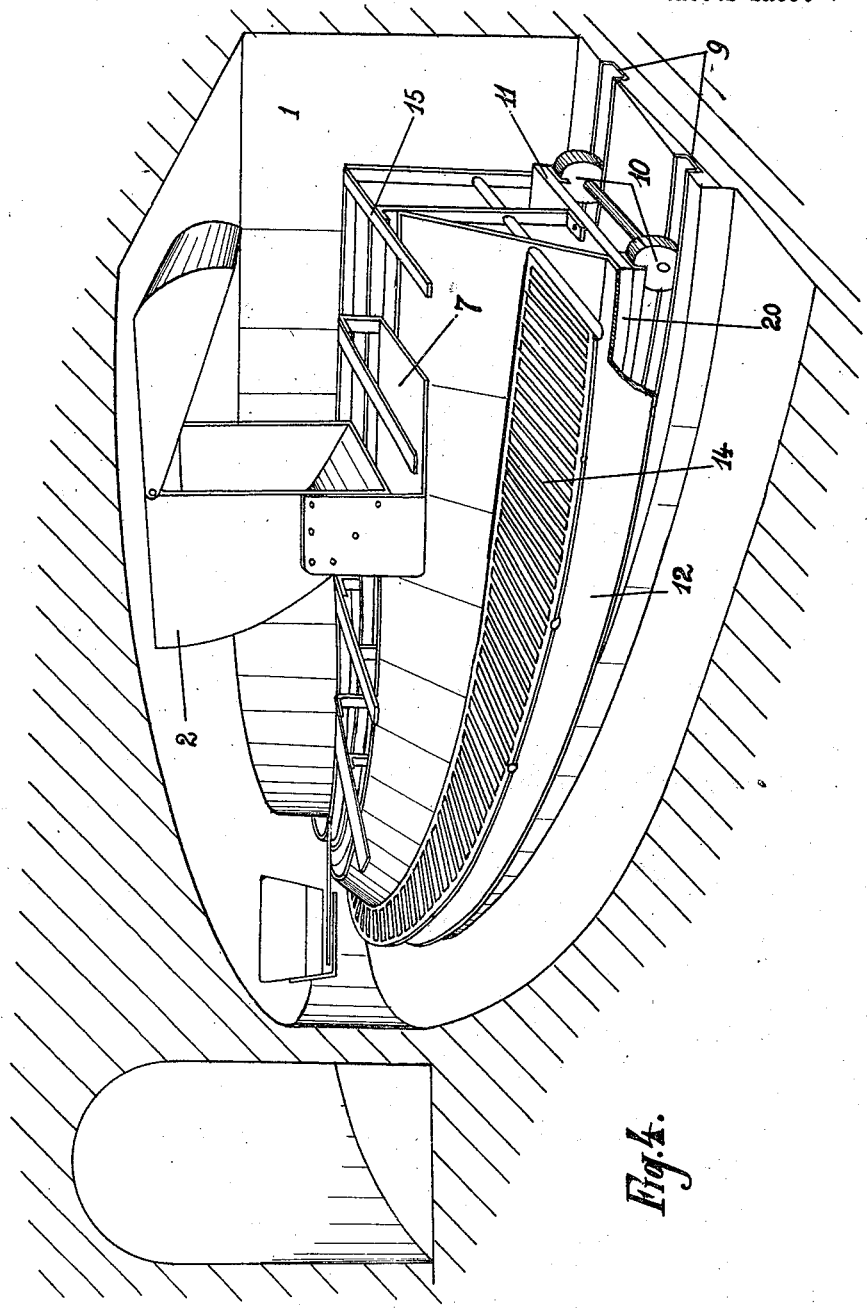
Fig. 4 is a view partly in section and partly in perspective of the complete arrangement.

The furnace is provided at its lower part with discharging hoppers 2. The hoppers generally remain fully opened. The flow through these hoppers of the material contained in the furnace is prevented by providing platforms 7 beneath these hoppers at a certain distance from their lower edge. The material rests on these platforms and forms from the edge of the hoppers to the level of the said platform mounds having a natural slope such as 3.

The discharge of the material from the kiln is effected by pushing a certain quantity of material to the bottom of the said platforms by means of movable raking bars 15.

It is evident that as the raking bars 15 remove material situated beneath the hoppers, this material is replaced by material flowing out of the hoppers and consequently derived from the furnace. This material is pushed to the edge of the platform 7 and falls on to a grid or grating 14 which retains the coarser material and allows the finer material to pass through, this latter falling on to a platform 12.

In order that these materials may be spread out over the grating 14 and the platform 12, these members are displaced simultaneously with the raking bars 15. For this purpose the said raking bars are fixed on a frame 11 which also carries the grid 14 and the platform 12. In order to allow of the displacement of the whole arrangement formed by these members, the frame 11 is carried by wheels 10 adapted to move in rails 9 arranged in the ground.

For the purpose of effecting a continuous and regular spreading of the material falling on the grating 14 and the platform 12, the latter are made in the form of a circular ring and are adapted to be displaced in a circular gallery 1 arranged in the lower part of the furnace and underneath the ceiling from which the apertures of the hoppers discharge.

The removal of the spread-out material on the grating 14 is effected by means of a fixed scoop 16 arranged on the said grating 14 on which scoop the material spread out on the grate is disposited continuously.

The foremost portion of the material deposited on the scoop 16 is pushed to the extremity thereof by the subsequent portion of the material continuously brought by the grating and whence they are deposited on a travelling belt 21 which conveys them to the outside of the oven.

The regularity of transport by the travelling belt, of the material brought by the grating 14 on the scraper 16, is effected by utilizing for actuating the travelling belt 21 and the grating 14, a common mechanism comprising a horizontal shaft 23 on which are keyed the drum 24 driving the travelling belt, and a bevelled pinion 25. This bevelled pinion 25 gears with a bevelled gearing 26 mounted on a vertical shaft 27 on which is keyed a gear 28 gearing with a rack 20 arranged on the periphery of the frame 11. This mechanism may be driven by means of suitable motor which drives a pulley 29 keyed on the end of the horizontal shaft 23.

Fine materials are removed from the platform 12 by a scraper 17 which may be combined with a travelling belt conveying these materials to any desired point. With a view to regulating the discharge of the furnace, the bars 15 are fixed in the frame in such a way that their radial length may be varied whereby the width of the section raked may be increased or diminished.

What I claim is:

1. Discharge apparatus for furnaces comprising discharging hoppers, platforms arranged under said hoppers, movable bars for pushing the material at the edge thereof, a movable grid arranged beneath said platform allowing the finer material to pass through and retaining the coarser material and means for connecting the grid with the movable bars so that they may be displaced simultaneously.

2. Discharge apparatus for furnaces comprising discharging hoppers, platforms arranged under said hoppers, movable bars for pushing the material at the edge thereof, a movable grid arranged beneath said platforms allowing the finer material to pass through and retaining the coarser material and a movable support on which the said grid and the said bars are fixed.

3. Discharge apparatus for furnaces comprising discharging hoppers, platforms arranged under said hoppers, movable bars for pushing the material at the edge thereof, a movable grid arranged beneath said platforms allowing the finer material to pass through and retaining the coarser material and a fixed scraper arranged over the movable grid for removing the material from the said grid.

4. Discharge apparatus for furnaces comprising discharging hoppers, platforms arranged under said hoppers, movable bars for pushing the material at the edge thereof, a movable grid arranged beneath said platforms allowing the finer material to pass through and retaining the coarser material, a movable plate under this grid to receive the finer material and fixed scrapers arranged above said grid and plate for removing respectively the coarser and the finer material.

5. Discharge apparatus for furnaces comprising a plurality of circumferentially arranged discharging hoppers, platforms arranged under said hoppers, a movable crown disposed beneath them and carrying bars for pushing the material to the edge of said platforms, a grid for retaining the coarser material falling from the platform, and a plate receiving the fine material which passes through said grid.

6. A discharge apparatus for furnaces comprising a plurality of stationary, spaced discharge hoppers, a fixed platform spaced below each of said hoppers to receive the material therefrom, a plurality of bars arranged at spaced intervals substantially equal to the length of said platforms, said bars mounted for movement along the upper face of said platforms for pushing the material thereon to the edge of the platforms, a movable grid arranged beneath said platforms to retain the coarser material while allowing the finer material to fall through, and means for connecting the grid with the movable bars to cause said bars and grid to move in unison.

7. Discharge apparatus for furnaces comprising discharging hoppers, platforms arranged under said hoppers, movable bars for pushing the material at the edge thereof, a movable grid arranged beneath said platforms allowing the finer material to pass through and retaining the coarser material, a movable plate under this grid to receive the finer material, fixed scrapers arranged above said grid and plate for removing respectively the coarser and finer material, and means interconnecting said bars, grid and plate.

In testimony whereof I affix my signature in presence of two witnesses.

PAUL DUMONT.

Witnesses:
ALFRED VANDER HAUGHEY,
LEONARD LERA.